United States Patent
Li

(10) Patent No.: US 11,638,997 B2
(45) Date of Patent: May 2, 2023

(54) POSITIONING AND NAVIGATION METHOD FOR A ROBOT, AND COMPUTING DEVICE THEREOF

(71) Applicant: CLOUDMINDS (BEIJING) TECHNOLOGIES CO., LTD., Beijing (CN)

(72) Inventor: Lianzhong Li, Beijing (CN)

(73) Assignee: CLOUDMINDS (BEIJING) TECHNOLOGIES CO., LTD., Beijing (CN)

( * ) Notice: Subject to any disclaimer, the term of this patent is extended or adjusted under 35 U.S.C. 154(b) by 672 days.

(21) Appl. No.: 16/698,475

(22) Filed: Nov. 27, 2019

(65) Prior Publication Data
US 2020/0164521 A1 May 28, 2020

(30) Foreign Application Priority Data

Nov. 27, 2018 (CN) .......................... 201811426508.2

(51) Int. Cl.
*B25J 9/16* (2006.01)
*G06T 7/30* (2017.01)
(Continued)

(52) U.S. Cl.
CPC ........... *B25J 9/1697* (2013.01); *B25J 9/1664* (2013.01); *G05D 1/0044* (2013.01);
(Continued)

(58) Field of Classification Search
CPC ......... B25J 9/1697; B25J 9/1664; G06T 7/30; G06T 17/05; G05D 1/0044; G05D 1/0274; G05D 1/0285
See application file for complete search history.

(56) References Cited

U.S. PATENT DOCUMENTS 9,754,490 B2 * 9/2017 Kentley .............. G05D 1/0088
10,678,262 B2 * 6/2020 Browning ............. G01C 21/32
(Continued)

FOREIGN PATENT DOCUMENTS

| CN | 106052697 A | 10/2016 |
|---|---|---|
| CN | 106056664 A | 10/2016 |

(Continued)

OTHER PUBLICATIONS

1st Office Search Report dated Mar. 17, 2020 by the CN Office; Appln. No. 201811426508.2.
(Continued)

*Primary Examiner* — Nicholas Kiswanto

(57) ABSTRACT

A positioning and navigation method for a robot includes: receiving point cloud information of a current position and information of a target position sent by a robot, wherein the point cloud information of the current position is updated in real time; determining the current position of the robot according to the point cloud information; planning a plurality of motion paths according to the current position and the target position; searching for an optimal path among the plurality of motion paths by a predetermined heuristic search algorithm; and sending the current position of the robot and the optimal path to the robot, such that the robot moves according to the optimal path.

14 Claims, 4 Drawing Sheets

(51) Int. Cl.
*G05D 1/00* (2006.01)
*G05D 1/02* (2020.01)
*G06T 17/05* (2011.01)

(52) U.S. Cl.
CPC ......... *G05D 1/0274* (2013.01); *G05D 1/0285* (2013.01); *G06T 7/30* (2017.01); *G06T 17/05* (2013.01)

(56) References Cited

U.S. PATENT DOCUMENTS

| | | | |
|---|---|---|---|
| 10,789,771 B2* | 9/2020 | Zhou | G06T 7/248 |
| 10,909,866 B2* | 2/2021 | Jacobus | G08G 1/096716 |
| 11,340,080 B2* | 5/2022 | Averilla | G06T 17/05 |
| 2011/0205338 A1* | 8/2011 | Choi | G06T 7/74 348/46 |
| 2017/0089710 A1 | 3/2017 | Slusar | |
| 2017/0316333 A1* | 11/2017 | Levinson | B60W 60/00274 |
| 2018/0210454 A1 | 7/2018 | Ready-Campbell et al. | |
| 2018/0275277 A1 | 9/2018 | Li et al. | |
| 2019/0206122 A1* | 7/2019 | Zhan | G01S 17/86 |
| 2019/0227553 A1* | 7/2019 | Kentley-Klay | B60L 58/12 |
| 2019/0323844 A1* | 10/2019 | Yendluri | G01C 21/28 |
| 2020/0164513 A1* | 5/2020 | Li | G05D 1/0285 |
| 2020/0164521 A1* | 5/2020 | Li | G06T 7/30 |

FOREIGN PATENT DOCUMENTS

| | | |
|---|---|---|
| CN | 106443641 A | 2/2017 |
| CN | 106940186 A | 7/2017 |
| CN | 108036793 A | 5/2018 |
| CN | 108303099 A | 7/2018 |
| CN | 108337915 A | 7/2018 |
| CN | 108571967 A | 9/2018 |
| EP | 3324209 A1 | 5/2018 |
| KR | 101615687 B1 | 4/2016 |
| WO | 2017053422 A1 | 3/2017 |

OTHER PUBLICATIONS

Wang Xuan, Ye Ping, Jia Qing-xuan, Stereo vision location and grid map building method, Software, 2012, 33(11): 233-236.

Zhao Huibin. Stereo Navigation Technology Based on Point Cloud Fusion[D]. Qinhuangdao: Yanshan University, Chinese Master's Theses Full-text Database Information Science and Technology, VI, I138-394, May 2018.

Whitty, M., Cossell, S., Dang, K. S., Guivant, J., & Katupitiya, J. (Dec. 2010). Autonomous navigation using a real-time 3d point cloud. In 2010 Australasian Conference on Robotics and Automation (pp. 1-3).

Biswas, J., & Veloso, M. (May 2012). Depth camera based indoor mobile robot localization and navigation. In 2012 IEEE International Conference on Robotics and Automation (pp. 1697-1702). IEEE.

Xugang Lian, Surveying and Mapping Press, Three-dimensional laser scanning technology engineering application practice(pp. 63), Sep. 30, 2017.

* cited by examiner

POSITIONING AND NAVIGATION METHOD FOR A ROBOT, AND COMPUTING DEVICE THEREOF

CROSS-REFERENCE TO RELATED APPLICATIONS

This application claims priority to Chinese Patent Application No. 201811426508.2, filed with the Chinese Patent Office on Nov. 27, 2018, titled "POSITIONING AND NAVIGATION METHOD AND APPARATUS FOR A ROBOT, AND COMPUTING DEVICE THEREOF", the entire contents of which are incorporated herein by reference.

TECHNICAL FIELD

Embodiments of the present application relate to the technical field of robot navigation, and in particular, relate to a positioning and navigation method and apparatus for a robot, a computing device, and a computer-readable storage medium thereof.

BACKGROUND

In mobile platforms such as robots and autonomous driving, etc., a positioning system plays an important role, and accurate and stable positioning is the basis of the system. At present, common positioning methods mainly include laser radar positioning method, vision positioning method, GPS satellite positioning method, mobile base station platform positioning method and the like, and a combination of various positioning methods. Among these positioning methods, the laser radar positioning method is the most reliable. Building information modeling (BIM) may provide a three-dimensional building model, which provides all the real information of the building by digital information simulation. The real information may be used as the basis and data for establishing a point cloud map, such that a precise point cloud is constructed.

The BIM provides a huge amount of three-dimensional building model information, and the data amount of a point cloud map constructed therebased may not be processed in real time in a robot locally.

SUMMARY

An embodiment of the present application provides a positioning and navigation method for a robot. The method includes: receiving point cloud information of a current position and information of a target position sent by a robot, wherein the point cloud information of the current position is updated in real time; determining the current position of the robot according to the point cloud information; planning a plurality of motion paths according to the current position and the target position; searching for an optimal path among the plurality of motion paths by a predetermined heuristic search algorithm; and sending the current position of the robot and the optimal path to the robot, such that the robot moves according to the optimal path.

Another embodiment of the present application provides a computing device. The computing device includes: a processor, a memory, a communication interface and a communication bus; wherein the processor, the memory and the communication bus communicate with each other via the communication bus; and the memory is configured to store at least one executable instruction, wherein the executable instruction, when being executed by the processor, causes the processor to perform the steps of: receiving point cloud information of a current position and information of a target position sent by a robot, wherein the point cloud information of the current position is updated in real time; determining the current position of the robot according to the point cloud information; planning a plurality of motion paths according to the current position and the target position; searching for an optimal path among the plurality of motion paths by a predetermined heuristic search algorithm; and sending the current position of the robot and the optimal path to the robot, such that the robot moves according to the optimal path.

Still another embodiment of the present application provides a computer-readable storage medium. The storage medium stores at least one executable instruction; wherein the executable instruction, when being executed, causes the processor to perform the steps of: receiving point cloud information of a current position and information of a target position sent by a robot, wherein the point cloud information of the current position is updated in real time; determining the current position of the robot according to the point cloud information; planning a plurality of motion paths according to the current position and the target position; searching for an optimal path among the plurality of motion paths by a predetermined heuristic search algorithm; and sending the current position of the robot and the optimal path to the robot, such that the robot moves according to the optimal path.

BRIEF DESCRIPTION OF THE DRAWINGS

By reading the detailed description of preferred embodiments hereinafter, various other advantages and beneficial effects become clear and apparent for persons of ordinary skill in the art. The accompanying drawings are merely for illustrating the preferred embodiments, but shall not be construed as limiting the present application. In all the accompanying drawings, like reference signs denote like parts. In the drawings.

DETAILED DESCRIPTION

Some exemplary embodiments of the present application are hereinafter described in detail with reference to the accompanying drawings. Although the accompanying drawings illustrate the exemplary embodiments of the present application, it shall be understood that the present application may be practiced in various manners, and the present application shall not be limited by the embodiments illustrated herein. On the contrary, these embodiments are described herein only for the purpose of better understanding the present application, and may integrally convey the scope of the present application to a person skilled in the art.

Figure 1:
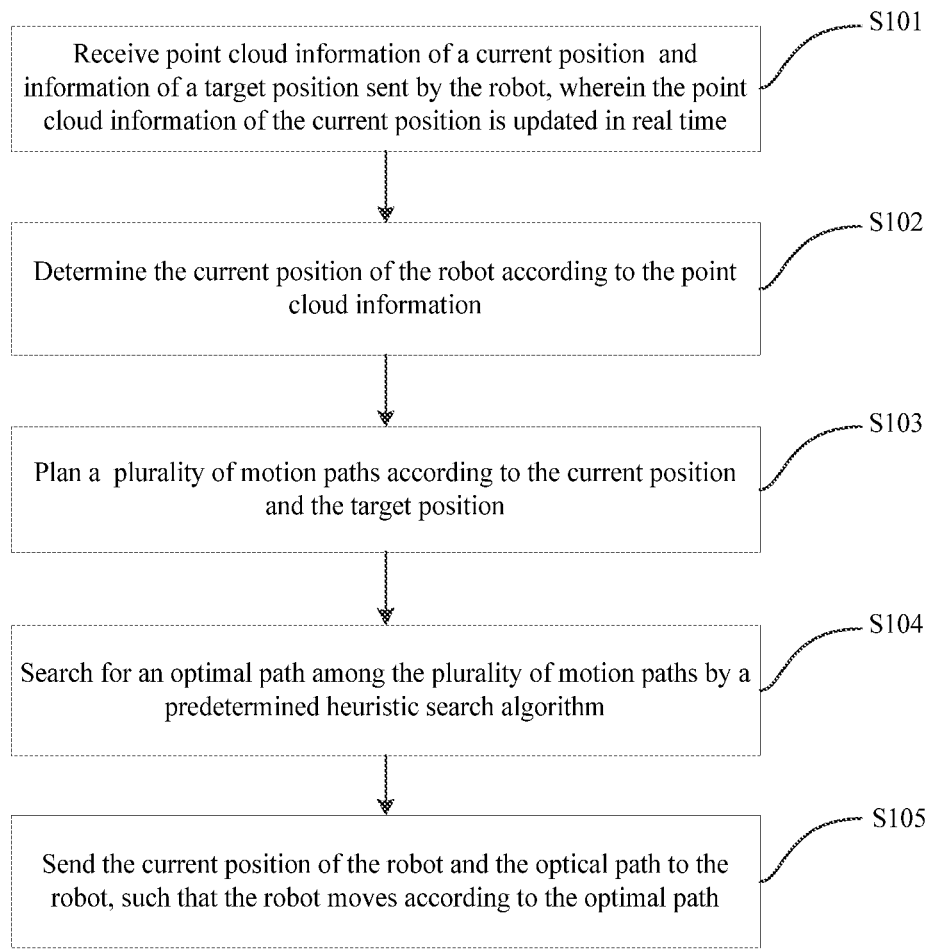
FIG. 1 is a flowchart of a positioning and navigation method for a robot according to an embodiment of the present application.

FIG. 1 is a flowchart of a positioning and navigation method for a robot according to an embodiment of the present application. The method is applied to a cloud server. As illustrated in FIG. 1, the method includes the following steps:

Step S101: Point cloud information of a current position and information of a target position sent by the robot are received, wherein the point cloud information of the current position is updated in real time.

In this step, the point cloud information of the current position sent by the robot is a point cloud generated by acquiring environmental information of the current position of the robot by Lidar equipped in the robot. In some embodiments, the point cloud information and information of a target position sent by the robot are transmitted to the cloud server over a 5G network in real time.

It should be understood that the robot moves in real time according to a planned path, and therefore the current position of the robot is updated in real time. An update frequency is consistent with a frequency of the Lidar equipped in the robot.

Step S102: The current position of the robot is determined according to the point cloud information.

Since the current position of the robot is unknown, the current position of the robot needs to be determined first so that a plurality of motion paths may be determined according to the current position and the target position.

In some embodiments, during positioning of the current position, the positioning may be performed by matching the point cloud information in the point cloud map, and in this case, step S102 may also include: when receiving the point cloud information of the current position sent by the robot, the cloud server extracts a three-dimensional map model corresponding to the point cloud information from a three-dimensional map model provided by the BIM, generates a point cloud map according to the three-dimensional map model corresponding to the point cloud information, and determines the current position of the robot according to the point cloud information and the point cloud map.

Figure 2:
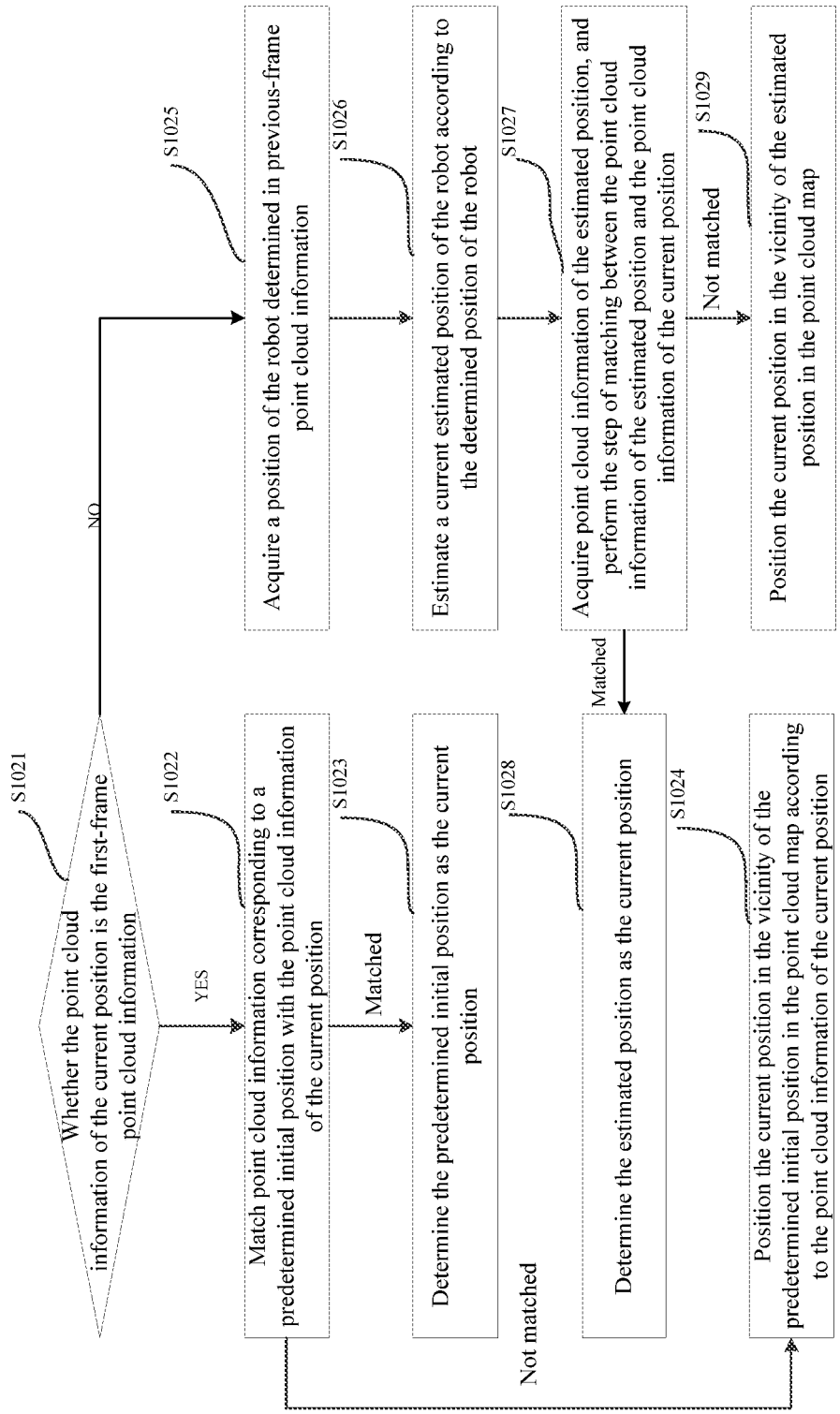
FIG. 2 is a schematic diagram of the method according to an embodiment of the present application.

In some embodiments, as illustrated in FIG. 2, the step of determining the current position of the robot according to the point cloud information and the point cloud map in step 102 includes the following steps:

Step S1021: Whether the point cloud information of the current position is the first-frame point cloud information is determined. Step S1022 is performed if the point cloud information of the current position is the first-frame point cloud information; and step S1025 is performed if the point cloud information of the current position is not the first-frame point cloud information.

Step S1022: Point cloud information corresponding to a predetermined initial position is matched with the point cloud information of the current position. Step S1023 is performed if the point cloud information corresponding to the predetermined initial position is matched with the point cloud information of the current position; and step S1024 is performed if the point cloud information corresponding to the predetermined initial position is not matched with the point cloud information of the current position.

Step S1023: The predetermined initial position is determined as the current position.

Step S1024: The current position is positioned in the vicinity of the predetermined initial position in the point cloud map according to the point cloud information of the current position.

In general situations, the robot may move back to the predetermined initial position to wait for another instruction when the robot does not need to move. When the point cloud information of the current position is the first-frame point cloud information, the probability that the robot is at the predetermined initial position is high. Therefore, matching the point cloud information at the predetermined initial position is favorable to improving a positioning speed of positioning the current position.

Step S1025: A position of the robot determined in previous-frame point cloud information is acquired.

Step S1026: A current estimated position of the robot is estimated according to the determined position of the robot.

Step S1027: Point cloud information of the estimated position is acquired, and the step of matching is performed between the point cloud information of the estimated position and the point cloud information of the current position. Step S1028 is performed if the point cloud information of the estimated position is matched with the point cloud information of the current position; and step S1029 is performed if the point cloud information of the estimated position is not matched with the point cloud information of the current position.

Step S1028: The estimated position is determined as the current position.

Step S1029: The current position is positioned in the vicinity of the estimated position in the point cloud map.

Positioning the current position of the robot according to the estimated position may narrow the range for positioning the current position, which improves the positioning speed as compared with the method of positioning the current position of the robot in the point cloud map in the entire serving region of the robot.

Step S103: A plurality of motion paths are planned according to the current position and the target position.

In this step, the plurality of motion paths are planned on a grid map, wherein the grid map is generated by the cloud server according to the three-dimensional map model provided by the BIM. Specifically, after the three-dimensional map model is acquired, all pavement models by which the robot can reach to the target position are extracted from the three-dimensional map model, and a two-dimensional plane is generated according to the pavement models; and the grid map is generated in a grid pattern according to the two-dimensional plane, wherein the grid map corresponds to the point cloud map. After the current position of the robot and the target position are determined in the point cloud map, the current position and the target position are mapped to the grid map to obtain a first position and a second position, wherein the first position corresponds to the current position in the point cloud map, and the second position corresponds to the target position in the point cloud map; and then the plurality of motion paths are planned in the grid map according to the first position and the second position.

It should be understood that during planning the plurality of motion paths in the grid map, a grid in the grid map corresponding to a travelable pavement in the point cloud map is marked as a first identification X(X is an integer, e.g., 1), an obstacle is marked as a second identification Y(Y is an integer, e.g., 256), and the planned paths (i.e. motion paths) are formed by all the grids marked as 1 that connect the first position and the second position.

Step S104: An optimal path is searched for among the plurality of motion paths by a predetermined heuristic search algorithm.

Many planned paths may be determined according to the grid map. When the robot is operating, the robot moves along one of the planned paths. An optimal path is searched for in the planned paths by a predetermined heuristic search algorithm. The predetermined heuristic search algorithm may be any algorithm in the conventional heuristic search algorithms, for example, the A* algorithm.

Step S105: The current position of the robot and the optimal path are sent to the robot, such that the robot moves according to the optimal path.

In this step, the cloud server sends the current position of the robot and the optimal path to the robot over the 5G network. Upon receiving the current position and the optimal path, the robot performs real-time partial path planning by a predetermined dynamic password algorithm to self-navigation of the robot. In addition, during navigation process of the robot, obstacles may also be avoided by virtue of an obstacle avoidance model.

In this embodiment of the present application, positioning is implemented in the point cloud map according to the point cloud information of the current position and information of the target position sent by the robot, path planning is carried out in the grid map, and an optimal path is searched for by the predetermined heuristic search algorithm and sent to the robot. In this way, the problem of insufficient operation capabilities of the robot is addressed, and all the calculations for navigation are performed at the cloud server, such that the speed of navigation of the robot is improved and self-navigation of the robot is achieved.

Figure 3:
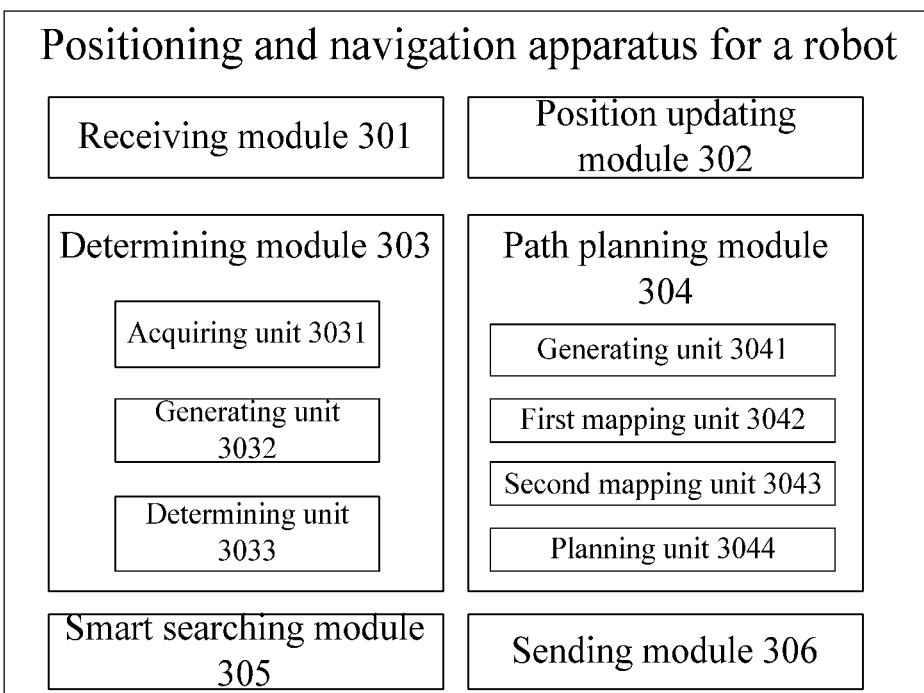
FIG. 3 is a functional block diagram of a positioning and navigation apparatus for a robot according to an embodiment of the present application.

FIG. 3 is a functional block diagram of a positioning and navigation apparatus for a robot according to an embodiment of the present application. As illustrated in FIG. 1, the apparatus includes: a receiving module 301, a position updating module 302, a determining module 303, a path planning module 304, a smart searching module 305 and a sending module 306.

The receiving module 301 is configured to receive point cloud information of a current position and information of a target position sent by the robot, wherein the point cloud information of the current position is updated in real time.

The position updating module 302 is configured to update the point cloud information of the current position.

The determining module 303 is configured to determine the current position of the robot according to the point cloud information.

The path planning module 304 is configured to plan a plurality of motion paths according to the current position and the target position.

The smart searching module 305 is configured to search for an optimal path among the plurality of motion paths by a predetermined heuristic search algorithm.

The sending module 306 is configured to send the current position of the robot and the optimal path to the robot, such that the robot moves according to the optimal path.

In this embodiment, the determining module 303 includes: an acquiring unit 3031, a generating unit 3032 and a determining unit 3033. The acquiring unit 3031 is configured to acquire a three-dimensional map model of a serving region of the robot. The generating unit 3032 is configured to generate a point cloud map according to the three-dimensional map model. The determining unit 3033 is configured to determine the current position of the robot according to the point cloud information and the point cloud map.

Further, the step of determining the current position of the robot according to the point cloud information and the point cloud map performed by the determining unit 3033 includes: determining whether the point cloud information of the current position is first-frame point cloud information; matching point cloud information corresponding to a predetermined initial position with the point cloud information of the current position if the point cloud information of the current position is the first-frame point cloud information; determining the predetermined initial position as the current position if the point cloud information corresponding to the predetermined initial position is matched with the point cloud information of the current position; and positioning the current position in the vicinity of the predetermined initial position in the point cloud map according to the point cloud information of the current position if the point cloud information corresponding to the predetermined initial position is not matched with the point cloud information of the current position.

Further, the step of determining the current position of the robot according to the point cloud information and the point cloud map performed by the determining unit 3033 further includes: acquiring a position of the robot determined in previous-frame point cloud information if the point cloud information of the current position is not the first-frame point cloud information; estimating a current estimated position of the robot according to the determined position of the robot; acquiring point cloud information of the estimated position, and matching the point cloud information of the estimated position with the point cloud information of the current position; determining the estimated position as the current position if the point cloud information of the estimated position is matched with the point cloud information of the current position; and positioning the current position in the vicinity of the estimated position in the point cloud map if the point cloud information of the estimated position is not matched with the point cloud information of the current position.

In this embodiment, the path planning module 304 includes: a generating unit 3041, a first mapping unit 3042, a second mapping unit 3043 and a planning unit 3044. The generating unit 3041 is configured to generate a grid map according to the three-dimensional map model, wherein the point cloud map corresponds to the grid map. The first mapping unit 3042 is configured to map the determined current position of the robot to the grid map to obtain a first position. The second mapping unit 3043 is configured to map the target position to the grid map to obtain a second position. The planning unit 3044 is configured to plan the plurality of motion paths in the grid map according to the first position and the second position.

Further, the step of generating the grid map according to the three-dimensional map model performed by the generating unit 3041 includes: extracting all pavement models by which the robot can reach to the target position from the three-dimensional map model, and generating a two-dimensional plane; and generating the grid map in a grid pattern according to the two-dimensional plane.

In this embodiment of the present application, the point cloud information of the current position and information of the target position sent by the robot are received by the receiving module, the current position of the robot is determined by the determining module, and path planning is carried out by the path planning module according to the information obtained by the receiving module and the determining module. In this way, the problem of insufficient operation capabilities of the robot is addressed, such that the speed of navigation of the robot is improved and self-navigation of the robot is achieved.

An embodiment of the present application provides a non-volatile computer-readable storage medium, wherein the computer-readable storage medium stores at least one computer-executable instruction, which may be executed to perform the positioning and navigation method for a robot in any of the above method embodiments.

Figure 4:
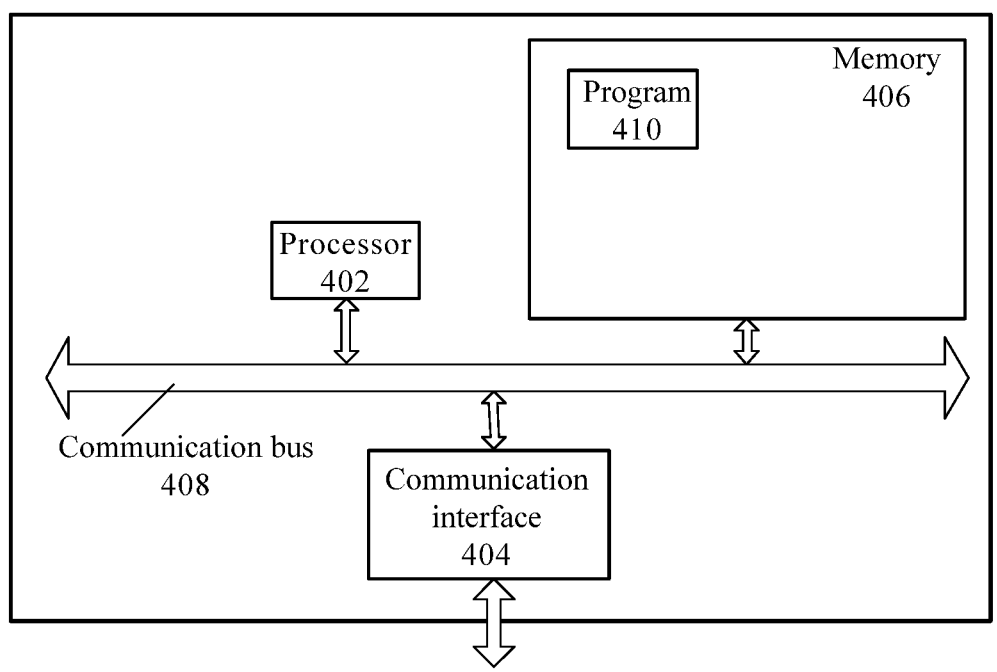
FIG. 4 is a functional block diagram of a computing device according to an embodiment of the present application.

FIG. 4 is a schematic structural diagram of a computing device according to an embodiment of the present application. The specific embodiments of the present application set no limitation to the practice of the computing device.

As illustrated in FIG. 4, the computing device may include: a processor 402, a communication interface 404, a memory 406 and a communication bus 408.

The processor 402, the communication interface 404 and the memory 406 communicate with each other via the communication bus 408.

The communication interface 404 is configured to communicate with a network element such as a client, a server or the like.

The processor 402 is configured to execute a program 410, and may specifically perform steps in the embodiments of the positioning and navigation method for a robot.

Specifically, the program 410 may include a program code, wherein the program code includes a computer-executable instruction.

The processor 402 may be a central processing unit (CPU) or an Application Specific Integrated Circuit (ASIC), or configured as one or more integrated circuits for implementing the embodiments of the present invention. The computing device includes one or more processors, which may be the same type of processors, for example, one or more CPUs, or may be different types of processors, for example, one or more CPUs and one or more ASICs.

The memory 406 is configured to store the program 410. The memory 406 may include a high-speed RAM memory, or may also include a non-volatile memory, for example, at least one magnetic disk memory.

The program 410 may be specifically configured to cause the processor 402 to perform the following operations:

receiving point cloud information of a current position and information of a target position sent by the robot, wherein the point cloud information of the current position is updated in real time;

determining the current position of the robot according to the point cloud information;

planning a plurality of motion paths according to the current position and the target position;

searching for an optimal path among the plurality of motion paths by a predetermined heuristic search algorithm; and sending the current position of the robot and the optimal path to the robot, such that the robot moves according to the optimal path.

In an optional implementation, the program 410 may be specifically further configured to cause the processor to perform the following operations:

acquiring a three-dimensional map model of a serving region of the robot;

generating a point cloud map according to the three-dimensional map model; and determining the current position of the robot according to the point cloud information and the point cloud map.

In an optional implementation, the program 410 may be specifically further configured to cause the processor to perform the following operations:

determining whether the point cloud information of the current position is first-frame point cloud information;

matching point cloud information corresponding to a predetermined initial position with the point cloud information of the current position if the point cloud information of the current position is the first-frame point cloud information;

determining the predetermined initial position as the current position if the point cloud information corresponding to the predetermined initial position is matched with the point cloud information of the current position; and positioning the current position in the vicinity of the predetermined initial position in the point cloud map according to the point cloud information of the current position if the point cloud information corresponding to the predetermined initial position is not matched with the point cloud information of the current position.

In an optional implementation, the program 410 may be specifically further configured to cause the processor to perform the following operations:

acquiring a position of the robot determined in previous-frame point cloud information if the point cloud information of the current position is not the first-frame point cloud information;

estimating a current estimated position of the robot according to the determined position of the robot;

acquiring point cloud information of the estimated position, and matching the point cloud information of the estimated position with the point cloud information of the current position;

determining the estimated position as the current position if the point cloud information of the estimated position is matched with the point cloud information of the current position; and positioning the current position in the vicinity of the estimated position in the point cloud map if the point cloud information of the estimated position is not matched with the point cloud information of the current position.

In an optional implementation, the program 410 may be specifically further configured to cause the processor to perform the following operations:

generating a grid map according to the three-dimensional map model, wherein the point cloud map corresponds to the grid map;

mapping the determined current position of the robot to the grid map to obtain a first position;

mapping the target position to the grid map to obtain a second position; and planning the plurality of motion paths in the grid map according to the first position and the second position.

Further, the program 410 may be specifically further configured to cause the processor to perform the following operations: extracting all pavement models by which the robot can reach to the target position from the three-dimensional map model, hand generating a two-dimensional plane; and generating the grid map in a grid pattern according to the two-dimensional plane.

The algorithms and displays provided herein are not inherently related to any specific computer, virtual system or other device. Various general-purpose systems may also be used with the teachings herein. According to the above description, the structure required for constructing such systems is obvious. In addition, the present application is not directed to any specific programming language. It should be understood that the content of the present application described herein may be carried out utilizing various programming languages, and that the above description for a specific language is for the sake of disclosing preferred embodiments of the present application.

In the specification provided herein, a plenty of particular details are described. However, it may be understood that an embodiment of the present application may also be practiced without these particular details. In some embodiments, well known methods, structures and technologies are not illustrated in detail so as not to obscure the understanding of the specification.

Likewise, it shall be understood that, to streamline the present application and facilitate understanding of one or more of various aspects of the present application, in the above description of the exemplary embodiments of the present application, various features of the present application are sometimes incorporated in an individual embodiment, drawing or description thereof. However, the method according to the present application shall not be explained to embody the following intention: the present application for which protection is sought claims more features than those explicitly disclosed in each of the appended claims. To be more exact, as embodied in the appended claims, the inventive aspects lie in that fewer features than all the features embodied in an individual embodiment as described above. Therefore, the claims observing the specific embodiments are herein incorporated into the specific embodiments, and each claim may be deemed as an individual embodiment of the present application.

Those skilled in the art should understand that modules in the devices according to the embodiments may be adaptively modified and these modules may be configured in one or more devices different from the embodiments herein. Modules or units or components in the embodiments may be combined into a single module or unit or component, and additionally these modules, units or components may be practiced in a plurality of sub-modules, subunits or subcomponents. Besides that such features and/or processes or at least some of the units are mutually exclusive, all the features disclosed in this specification (including the appended claims, abstract and accompanying drawings) and all the processes or units in such disclosed methods or devices may be combined in any way. Unless otherwise stated, each of the features disclosed in this specification (including the appended claims, abstract and accompanying drawings) may be replaced by a provided same, equivalent or similar substitution.

In addition, those skilled in the art shall understand that, although some embodiments described herein include some features included in other embodiments, rather than other features, a combination of the features in different embodiments signifies that the features are within the scope of the present application and different embodiments may be derived. For example, in the claims appended hereinafter, any one of the embodiments for which protection is sought may be practiced in any combination manner.

Embodiments of the individual components of the present application may be implemented in hardware, or in a software module running one or more processors, or in a combination thereof. It will be appreciated by those skilled in the art that, in practice, some or all of the functions of some or all of the components in the message prompting apparatus according to individual embodiments of the present application may be implemented using a microprocessor or a digital signal processor (DSP). The present application may also be implemented as an apparatus of a device program (e.g., a computer program and a computer program product) for performing a part or all of the method as described herein. Such a program implementing the present application may be stored on a computer readable medium, or may be stored in the form of one or more signals. Such a signal may be obtained by downloading it from an Internet website, or provided on a carrier signal, or provided in any other form.

It should be noted that the above embodiments illustrate rather than limit the present application, and those skilled in the art may design alternative embodiments without departing from the scope of the appended claims. In the claims, any reference sign placed between the parentheses shall not be construed as a limitation to a claim. The word "comprise" or "include" does not exclude the presence of an element or a step not listed in a claim. The word "a" or "an" used before an element does not exclude the presence of a plurality of such elements. The present application may be implemented by means of a hardware including several distinct elements and by means of a suitably programmed computer. In a unit claim enumerating several devices, several of the devices may be embodied by one and the same hardware item. Use of the words "first", "second", "third" and the like does not mean any ordering. Such words may be construed as naming.

What is claimed is:

1. A positioning and navigation method for a robot, comprising:
   at a cloud server;
   receiving point cloud information of a current position and information of a target position sent by a robot, wherein the point cloud information of the current position is updated in real time;
   determining the current position of the robot according to the point cloud information;
   planning a plurality of motion paths according to the current position and the target position;
   searching for an optimal path among the plurality of motion paths by a predetermined heuristic search algorithm; and
   sending the current position of the robot and the optimal path to the robot; and the robot's moving according to the optimal path;
   wherein the determining the current position of the robot according to the point cloud information comprises:
   acquiring a three-dimensional map model of a serving region of the robot;
   generating a point cloud map according to the three-dimensional map model; and
   determining the current position of the robot according to the point cloud information and the point cloud map;
   wherein the determining the current position of the robot according to the point cloud information and the point cloud map comprises:
   determining whether the point cloud information of the current position is first-frame point cloud information;
   matching point cloud information corresponding to a predetermined initial position with the point cloud information of the current position if the point cloud information of the current position is the first-frame point cloud information;
   determining the predetermined initial position as the current position if the point cloud information, corresponding to the redetermined initial position is matched with the point cloud information of the current position; and
   positioning the current position in the vicinity of the predetermined initial position in the point cloud map according to the point cloud information of the current position if the point cloud information corresponding to the predetermined initial position is not matched with the point cloud information of the current position.

2. The method according to claim 1, further comprising:
acquiring a position of the robot determined in previous-frame point cloud information if the point cloud information of the current position is not the first-frame point cloud information;
estimating a current estimated position of the robot according to the determined position of the robot;
acquiring point cloud information of the estimated position;
matching the point cloud information of the estimated position with the point cloud information of the current position;
determining the estimated position as the current position if the point cloud information of the estimated position is matched with the point cloud information of the current position; and
positioning the current position in the vicinity of the estimated position in the point cloud map if the point cloud information of the estimated position is not matched with the point cloud information of the current position.

3. The method according to claim 1, wherein the planning the plurality of motion paths according to the current position and the target position comprises:
generating a grid map according to the three-dimensional map model, wherein the point cloud map corresponds to the grid map;
mapping the determined current position of the robot to the grid map to obtain a first position;
mapping the target position to the grid map to obtain a second position; and
planning the plurality of motion paths in the grid map according to the first position and the second position.

4. The method according to claim 3, wherein the generating the grid map according to the three-dimensional map model comprises:
extracting all pavement models by which the robot reaches to the target position from the three-dimensional map model;
generating a two-dimensional plane according to the pavement models; and
generating the grid map in a grid pattern according to the two-dimensional plane.

5. The method according to claim 3, wherein the planning the plurality of motion paths in the grid map according to the first position and the second position comprises:
marking a grid in the grid map corresponding to a travelable pavement in the point cloud map as a first identification;
marking a grid in the grid map corresponding to an obstacle in the point cloud map as a second identification; and
forming the plurality of motion paths by all the grids which are connecting the first position and the second position and marked as the first identification.

6. A computing device, comprising: a processor, a memory, a communication interface and a communication bus; wherein the processor, the memory and the communication bus communicate with each other via the communication bus; and the memory is configured to store at least one executable instruction, wherein the executable instruction, when being executed by the processor, causes the processor to perform the steps of:
receiving point cloud information of a current position and information of a target position sent by a robot, wherein the point cloud information of the current position is updated in real time;
determining the current position of the robot according to the point cloud information;
planning a plurality of motion paths according to the current position and the target position;
searching for an optimal path among the plurality of motion paths by a predetermined heuristic search algorithm; and
sending the current position of the robot and the optimal path to the robot;
the robot's moving according to the optimal path
wherein the determining the current position of the robot according to the point cloud information comprises:
acquiring a three-dimensional map model of a serving region of the robot;
generating a point cloud map according to the three-dimensional map model; and
determining the current position of the robot according to the point cloud information and the point cloud map;
wherein the determining the current position of the robot according to the point cloud information and the point cloud map comprises:
determining whether the point cloud information of the current position is first-frame point cloud information;
matching point cloud information corresponding to a predetermined initial position with the point cloud information of the current position if the point cloud information of the current position is the first-frame point cloud information;
determining the predetermined initial position as the current position if the point cloud information corresponding to the predetermined initial position is matched with the point cloud information of the current position; and
positioning the current position in the vicinity of the predetermined initial position in the point cloud map according to the point cloud information of the current position if the point cloud information corresponding to the predetermined initial position is not matched with the point cloud information of the current position.

7. The computing device according to claim 6, wherein the executable instruction, when being executed by the processor, further causes the processor to perform the steps of:
acquiring a position of the robot determined in previous-frame point cloud information if the point cloud information of the current position is not the first-frame point cloud information;
estimating a current estimated position of the robot according to the determined position of the robot;
acquiring point cloud information of the estimated position;
matching the point cloud information of the estimated position with the point cloud information of the current position;
determining the estimated position as the current position if the point cloud information of the estimated position is matched with the point cloud information of the current position; and
positioning the current position in the vicinity of the estimated position in the point cloud map if the point cloud information of the estimated position is not matched with the point cloud information of the current position.

8. The computing device according to claim 6, wherein the planning the plurality of motion paths according to the current position and the target position comprises:

generating a grid map according to the three-dimensional map model, wherein the point cloud map corresponds to the grid map;

mapping the determined current position of the robot to the grid map to obtain a first position;

mapping the target position to the grid map to obtain a second position; and planning the plurality of motion paths in the grid map according to the first position and the second position.

9. The computing device according to claim 8, wherein the generating the grid map according to the three-dimensional map model comprises:

extracting all pavement models by which the robot reaches to the target position from the three-dimensional map model;

generating a two-dimensional plane according to the pavement models; and generating the grid map in a grid pattern according to the two-dimensional plane.

10. The computing device according to claim 8, wherein the planning the plurality of motion paths in the grid map according to the first position and the second position comprises:

marking a grid in the grid map corresponding to a travelable pavement in the point cloud map as a first identification;

marking a grid in the grid map corresponding to an obstacle in the point cloud map as a second identification, wherein the second identification is different from the first identification; and forming the plurality of motion paths by all the grids which are connecting the first position and the second position and marked as the first identification.

11. A non-transitory computer-readable storage medium, the storage medium storing at least one executable instruction; wherein the executable instruction, when being executed, causes the processor to perform the steps of:

receiving point cloud information of a current position and information of a target position sent by a robot, wherein the point cloud information of the current position is updated in real time;

determining the current position of the robot according to the point cloud information;

planning a plurality of motion paths according to the current position and the target position;

searching for an optimal path among the plurality of motion paths by a predetermined heuristic search algorithm; and sending the current position of the robot and the optimal path to the robot; and the robot's moving according to the optimal path wherein the determining the current position of the robot according to the point cloud information comprises:

acquiring a three-dimensional map model of a serving region of the robot;

generating a point cloud map according to the three-dimensional map model; and determining the current position of the robot according to the point cloud information and the point cloud map;

wherein the determining the current position of the robot according to the point cloud information and the point cloud map comprises:

determining whether the point cloud information of the current position is first-frame point cloud information;

matching point cloud information corresponding to a predetermined initial position with the point cloud information of the current position if the point cloud information of the current position is the first-frame point cloud information;

determining the predetermined initial position as the current position if the point cloud information corresponding to the predetermined initial position is matched with the point cloud information of the current position; and positioning the current position in the vicinity of the predetermined initial position in the point cloud map according to the point cloud information of the current position if the point cloud information corresponding to the predetermined initial position is not matched with the point cloud information of the current position.

12. The non-transitory computer-readable storage medium according to claim 11, wherein the executable instruction, when being executed, further causes the processor to perform the steps of:

acquiring a position of the robot determined in previous-frame point cloud information if the point cloud information of the current position is not the first-frame point cloud information;

estimating a current estimated position of the robot according to the determined position of the robot;

acquiring point cloud information of the estimated position;

matching the point cloud information of the estimated position with the point cloud information of the current position;

determining the estimated position as the current position if the point cloud information of the estimated position is matched with the point cloud information of the current position; and positioning the current position in the vicinity of the estimated position in the point cloud map if the point cloud information of the estimated position is not matched with the point cloud information of the current position.

13. The non-transitory computer-readable storage medium according to claim 11, wherein the planning the plurality of motion paths according to the current position and the target position comprises:

generating a grid map according to the three-dimensional map model, wherein the point cloud map corresponds to the grid map;

mapping the determined current position of the robot to the grid map to obtain a first position;

mapping the target position to the grid map to obtain a second position; and planning the plurality of motion paths in the grid map according to the first position and the second position.

14. The non-transitory computer-readable storage medium according to claim 13, wherein the generating the grid map according to the three-dimensional map model comprises:

extracting all pavement models by which the robot reaches to the target position from the three-dimensional map model;

generating a two-dimensional plane according to the pavement models; and generating the grid map in a grid pattern according to the two-dimensional plane.

* * * * *